(12) United States Patent
Yang et al.

(10) Patent No.: US 11,698,193 B2
(45) Date of Patent: Jul. 11, 2023

(54) CONTROL METHOD OF STEPWISE AND STEPLESS LINEAR ADJUSTMENT OF GAS OVEN AND ITS GAS VALVE

(71) Applicant: JIANGSU JIUHUI TECHNOLOGY CO., LTD., Taizhou (CN)

(72) Inventors: Lanyu Yang, Taizhou (CN); Tao Chen, Taizhou (CN); Xifeng Yang, Taizhou (CN); Jiuhui Bian, Taizhou (CN); Wei Gu, Taizhou (CN); Wenbin Ma, Taizhou (CN); Ming He, Taizhou (CN); Zhengbing Zhu, Taizhou (CN); Xuedan Liu, Taizhou (CN)

(73) Assignee: JIANGSU JIUHUI TECHNOLOGY CO., LTD., Taizhou (CN)

( * ) Notice: Subject to any disclaimer, the term of this patent is extended or adjusted under 35 U.S.C. 154(b) by 178 days.

(21) Appl. No.: 17/161,689

(22) Filed: Jan. 29, 2021

(65) Prior Publication Data
US 2022/0146101 A1 May 12, 2022

Related U.S. Application Data

(63) Continuation of application No. PCT/CN2020/130269, filed on Nov. 20, 2020.

(30) Foreign Application Priority Data

Nov. 9, 2020 (CN) .......................... 202011241206.5

(51) Int. Cl.
*F24C 3/02* (2021.01)
*F24C 3/12* (2006.01)
(Continued)

(52) U.S. Cl.
CPC .............. *F24C 3/122* (2013.01); *F24C 3/025* (2013.01); *F24C 15/002* (2013.01); *F16K 1/32* (2013.01);
(Continued)

(58) Field of Classification Search
CPC .......... F24C 3/122; F24C 3/025; F24C 3/124; F24C 3/128; F24C 15/002; F16K 1/32;
(Continued)

(56) References Cited

U.S. PATENT DOCUMENTS 10,638,881 B1 * 5/2020 Holt ..................... A47J 37/0754
11,105,512 B2 * 8/2021 Cowan ..................... F16K 31/02

FOREIGN PATENT DOCUMENTS

CN       208957815 U  *  6/2019
CN       209518764 U  * 10/2019
(Continued)

OTHER PUBLICATIONS

State Intellectual Property Office of People's Republic of China; First Office Action for Application No. 202011241206.5; 9 pages, dated Aug. 27, 2021 (Year: 2021).*

(Continued)

*Primary Examiner* — William J Levicky
*Assistant Examiner* — Bryan M Badalamenti
(74) *Attorney, Agent, or Firm* — Bayramoglu Law Offices LLC

(57) ABSTRACT

A control method of stepwise and stepless linear adjustment of a gas oven includes step 1: obtaining the setting temperature of the gas oven; step 2: obtaining the temperature inside the gas oven; step 3: determining the low temperature threshold, high temperature threshold and preset flame level according to the setting temperature, wherein the high temperature threshold is greater than the low temperature threshold; step 4: ensuring the temperature inside the gas oven is between the low temperature threshold and the high temperature threshold; step 5: if it exceeds, determining the change trend of the temperature inside the gas oven; step 6:
(Continued)

when the change trend of the temperature inside the gas oven rises or falls, adjusting the flame level of the gas oven to the preset flame level.

12 Claims, 6 Drawing Sheets

(51) Int. Cl.
    *F16K 1/32*     (2006.01)
    *F24C 15/00*     (2006.01)
    *F16K 31/04*     (2006.01)

(52) U.S. Cl.
    CPC ............... *F16K 31/04* (2013.01); *F24C 3/12* (2013.01); *F24C 3/124* (2013.01)

(58) Field of Classification Search
    CPC ........... F16K 2200/55; F16K 2200/301; F16K 27/00; F16K 27/04; F16K 27/12; F16K 31/02; F16K 31/04; F16K 31/055; F17C 13/04; F17C 2250/03
    See application file for complete search history.

(56) References Cited

FOREIGN PATENT DOCUMENTS

| | | | | |
|---|---|---|---|---|
| CN | 209562089 U | * | 10/2019 | |
| CN | 110986110 A | * | 4/2020 | ............. F24C 3/126 |
| CN | 112833222 A | * | 5/2021 | ............. F16K 11/20 |
| CN | 114165628 A | * | 3/2022 | |

OTHER PUBLICATIONS

State Intellectual Property Office of People's Republic of China; Second Office Action for Application No. 202011241206.5; 9 pages, dated Mar. 2, 2022 (Year: 2022).*
TE Connectivity, Understanding RTDs, 10 pages, 2022 (Year: 2022).*

* cited by examiner

CONTROL METHOD OF STEPWISE AND STEPLESS LINEAR ADJUSTMENT OF GAS OVEN AND ITS GAS VALVE

CROSS REFERENCE TO THE RELATED APPLICATIONS

This application is a continuation application of International Application No. PCT/CN2020/130269, filed on Nov. 20, 2020, which is based upon and claims priority to Chinese Patent Application No. 202011241206.5, filed on Nov. 9, 2020, the entire contents of which are incorporated herein by reference.

TECHNICAL FIELD

The present invention relates to the technical field of valves, and in particular to a control method of stepwise and stepless linear adjustment of a gas oven and its gas valve.

BACKGROUND

Ovens may use gas or electricity as a power source. The gas oven is one of the most popular kitchen appliances. With advances in technology, users have become especially interested in remote control of gas ovens through mobile phones.

However, valves of existing gas ovens have the following problems:

1. The valving of current gas ovens is difficult to be remotely controlled by way of the mobile phone APP, which reduces the usability of the gas valve. At the same time, the gas valve is generally controlled by a stepper motor. When the stepper motor is damaged and needs to be removed or repaired, it is time-consuming and laborious because the traditional stepper motor is cumbersome to install, resulting in poor practicability; and 2. Generally, seals between the valve of the gas oven and the gas pipe, and between the valve of the gas oven and the connecting pipe are both poor, which results in gas leakage. This not only fails the user's utility needs, but it is unacceptable to the health and safety of persons and property.

SUMMARY

(1) Technical Problems to be Solved

In view of the shortcomings of the prior art, the present invention provides a control method of stepwise and stepless linear adjustment of a gas oven and its gas valve, which solves the problems of difficulty with remote controlled using a mobile phone APP, inconvenient disassembly of the stepping motor and poor sealing between the gas valve and piping.

(2) Technical Solutions

In order to achieve the above purposes, the present invention provides the following technical solutions:

The present invention discloses a control method of stepwise and stepless linear adjustment of a gas oven, which includes the following steps:

step 1: obtaining a setting temperature of the gas oven;
step 2: obtaining a temperature inside the gas oven;
step 3: determining a low temperature threshold, a high temperature threshold and a preset flame level according to the setting temperature, wherein the high temperature threshold is greater than the low temperature threshold;
step 4: enabling the temperature inside the gas oven is between the low temperature threshold and the high temperature threshold;
step 5: determining a change trend of the temperature inside the gas oven if it exceeds the low temperature threshold or the high temperature threshold;
step 6: adjusting the flame level of the gas oven to the preset flame level when the change trend of the temperature inside the gas oven rises or falls.

Preferably, the temperature control inside the gas oven is divided into stepwise adjustment and stepless linear adjustment.

Preferably, in step 1, a user can set the temperature through a panel button of the gas oven, and the setting temperature refers to the internal temperature at a head of the gas oven.

Preferably, in step 2, the temperature and gas leakage in the gas oven can be detected by a temperature sensor and a gas sensor installed on the head of the gas oven. If the temperature detected by the temperature sensor is less than the threshold determined in step 3, and gas is detected in the gas oven at this time, then it can be determined there is gas leakage.

Preferably, when the preset flame level is determined by the setting temperature, the preset flame varies with the different setting temperatures.

Preferably, the gas oven can provide at least multiple levels of flame and store the multiple levels of flame in a memory, such as electrically erasable programmable read-only memory (EEPROM), of a gas oven controller.

Preferably, in step 4 to step 6, the gas oven is heated so that the temperature inside the gas oven is between the low temperature threshold and the high temperature threshold. Temperature rising or falling trend can be determined according to the change of the temperature inside the gas oven, and then the flame of the gas oven is controlled according to the temperature rising or falling trend, thereby maintaining the temperature inside the gas oven at the setting temperature.

Preferably, when the temperature rising trend in the gas oven is determined, the flame is reduced to a lower flame level; when the temperature falling trend in the gas oven is determined, the flame is increased to the preset flame level.

Preferably, it also includes a communication module to remotely connect the controller to the APP network terminal, and remotely controls the use of the gas valve body through the mobile phone.

The present invention proposes a stepwise gas valve of a gas oven, including a gas oven body. One side of the gas oven body is provided with a gas tank. The port of the gas tank is fixedly connected to a gas pipe. The end of the gas pipe is provided with a gas valve body. The top of the gas valve body is fixedly connected to a fixed plate. The surface of the fixed plate is provided with a positioning slot. The inner wall of the positioning slot is slidably connected with a sliding plate. Both sides of the sliding plate are provided with limited holes. The top of the sliding plate is fixedly connected with a mounting plate. The top of the mounting plate is fixedly connected with a stepping motor. The top of the gas valve body is fixedly connected with a fixed block. The top of the fixed block is provided with a fixed groove. The inner wall of the fixed groove is fixedly connected with a fixed rod. A spring is sleeved on the surface of the fixed rod. The surface of the fixed rod is slidably connected with a sliding sleeve. The top of the sliding sleeve is fixedly connected with a connecting plate. One side of the connecting plate is fixedly connected with an engaged rod. The end of the engaged rod is engaged with the inner wall of the limited hole. Both ends of the gas valve body are fixedly connected with a first connecting block. The end surface of the first connecting block is provided with a sealing groove. The inner wall of the sealing groove is provided with a sealing gasket. The inner wall of the sealing groove is slidably connected with a sealing plate. One side of the sealing plate is fixedly connected with a second connecting block. One side of the second connecting block is fixedly connected with a connecting pipe. The end of the connecting pipe is fixedly connected with the bottom of the gas oven body. A fixed screw penetrates through the inside of the first connecting block and the second connecting block. The surface of the fixed screw is in a threaded connection with a fixed nut. The other side of the gas oven body is fixedly connected with a control box. The inner wall of the control box is provided with a controller. The inner bottom wall of the control box is fixedly connected with a memory. The inner side wall of the control box is fixedly connected with a communication module. A temperature sensor is installed on the inner side wall of the gas oven body, and the temperature sensor can be a pt100 temperature sensor.

Preferably, the surface of the control box is rotatably connected with a box door through a hinge. The box door is internally provided with a heat dissipation groove. The inner wall of the heat dissipation groove is mounted with a cooling fan. The inner wall of the heat dissipation groove is fixedly connected with a filter screen.

Preferably, the surface of the sliding sleeve is fixedly connected with a sliding block. The surface of the sliding block is slidably connected with the inner wall of the fixed groove. The diameter of the inner wall of the limited hole is adapted to the diameter of the end of the engaged rod. The left side of the second connecting block is fixedly connected with the end of the gas pipe.

(3) Advantages

Compared with the prior art, the present invention provides a control method of stepwise and stepless linear adjustment of a gas oven and its gas valve, which has the following advantages:

In the control method of stepwise and stepless linear adjustment of the gas oven and its gas valve of the present invention, through the use of the controller, communication module and memory, the controller is connected to the mobile phone APP via a network. The gas valve can be remotely controlled through the mobile phone, including menu storage call, to realize stepwise control.

In the figures, 1. gas oven body, 2·gas tank, 3. gas pipe, 4. gas valve body, 5. fixed plate, 6. positioning slot, 7. sliding plate, 8. limited hole, 9. mounting plate, 10. stepping motor, 11. fixed block, 12. fixed groove, 13. fixed rod, 14. spring, 15. sliding sleeve, 16. connecting plate, 17. engaged rod, 18. first connecting block, 19. sealing groove, 20. sealing gasket, 21. sealing plate, 22. second connecting block, 23. connecting pipe, 24. fixed screw, 25. fixed nut, 26. control box, 27. controller, 28. memory, 29. communication module, 30. box door, 31. heat dissipation groove, 32. cooling fan, 33. filter screen, 34. supporting leg, 35. reinforcing plate, 36. sliding block, 37. temperature sensor.

DETAILED DESCRIPTION OF THE EMBODIMENTS

The technical scheme in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by ordinary technicians in the field without making creative work shall fall within the scope of protection of the present invention.

Embodiments

Figure 1:
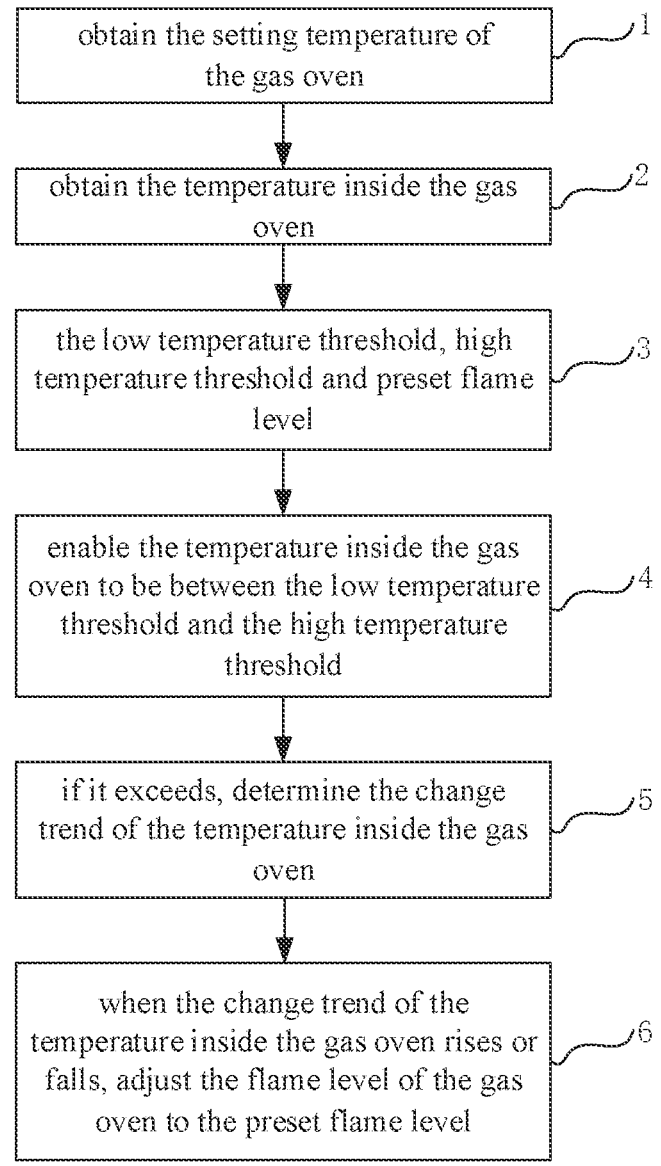
FIG. 1 is a flow chart showing the control process of the present invention.
Figure 2:
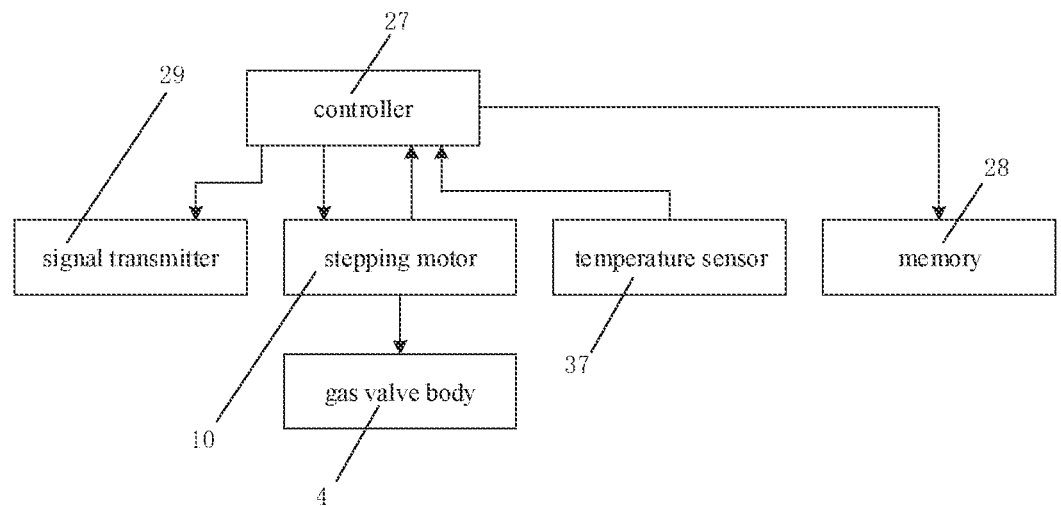
FIG. 2 is a block diagram of the present invention.
Figure 3:
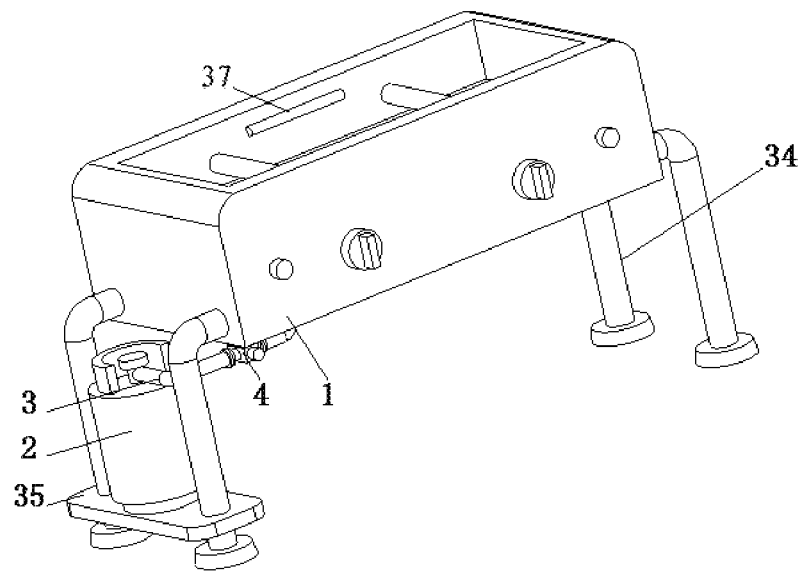
FIG. 3 is a front perspective view of the present invention.
Figure 4:
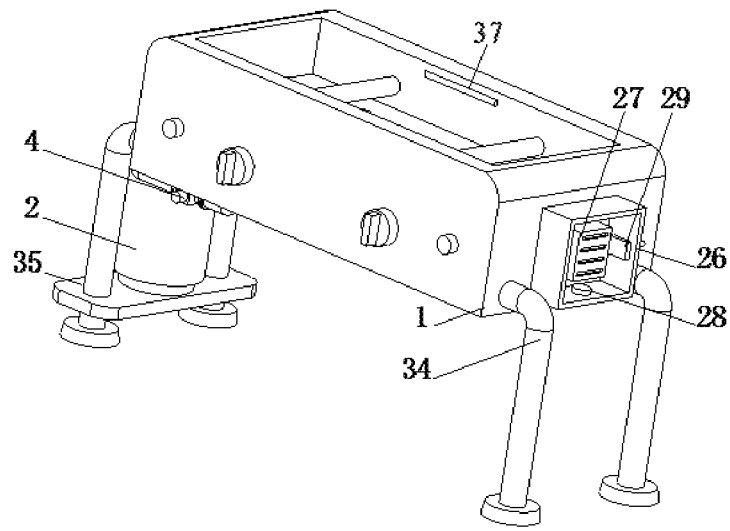
FIG. 4 is a side perspective view of the present invention.
Figure 5:
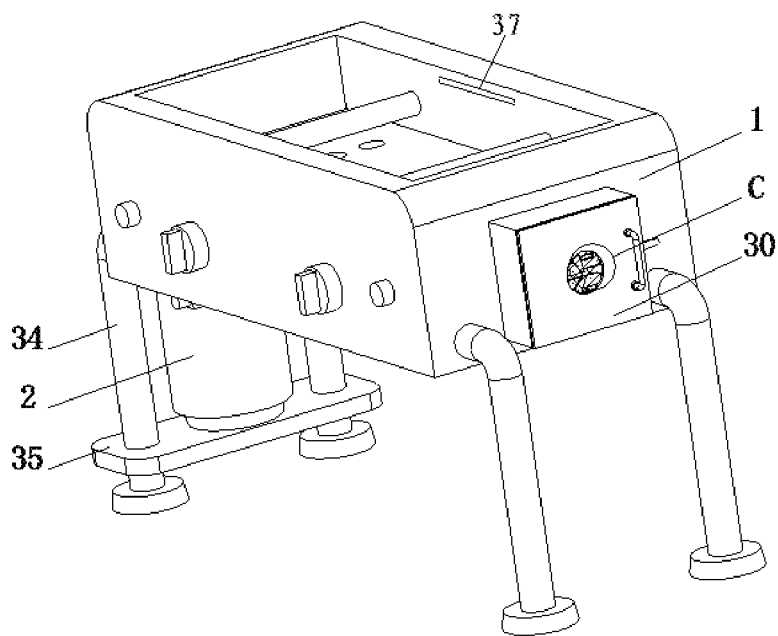
FIG. 5 is a schematic diagram of a box door structure of the present invention.
Figure 6:
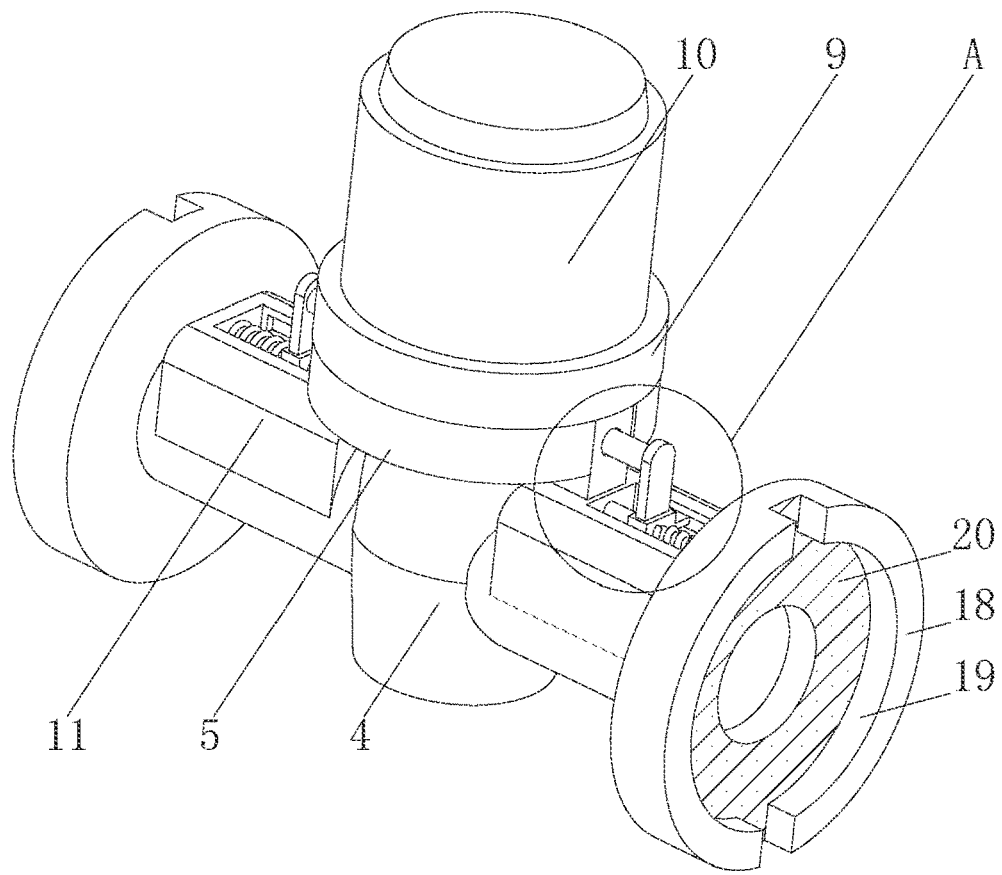
FIG. 6 is a schematic diagram of a gas valve body structure of the present invention.
Figure 7:
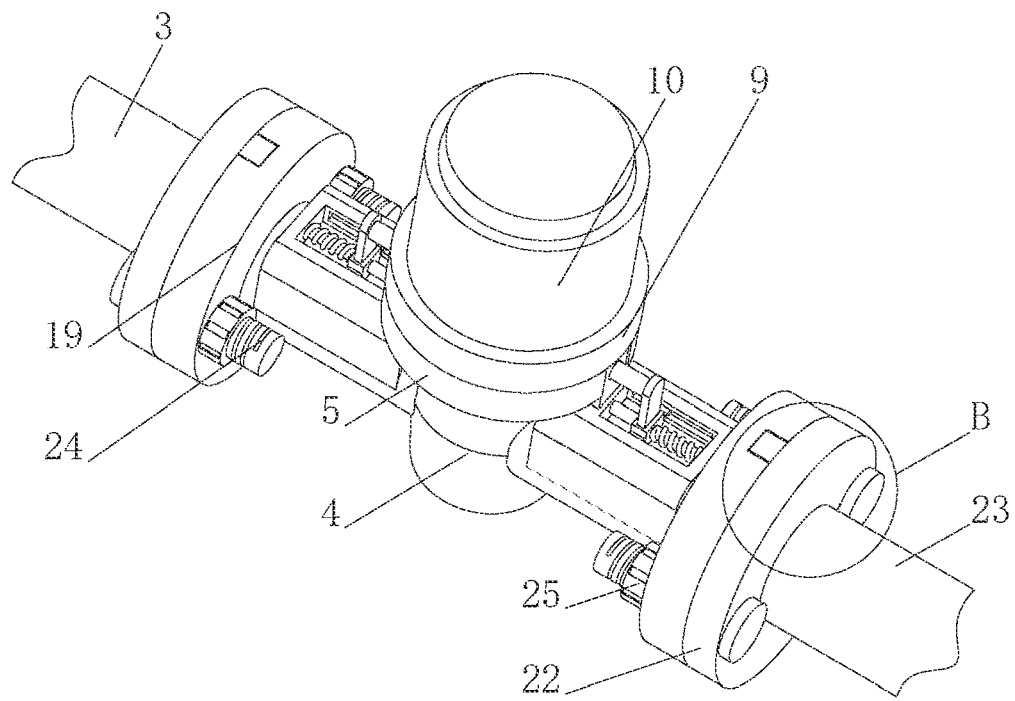
FIG. 7 is a schematic diagram showing a structure of the connection between the gas valve body and the gas pipe of the present invention.
Figure 8:
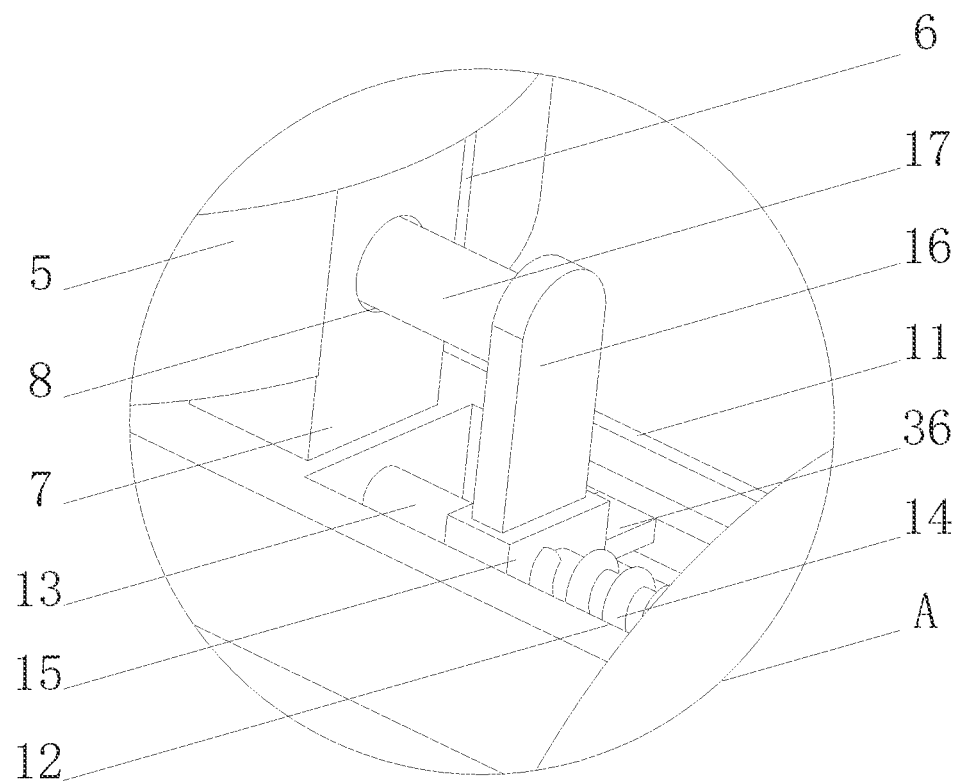
FIG. 8 is an enlarged view of the portion A in FIG. 6 of the present invention.
Figure 9:
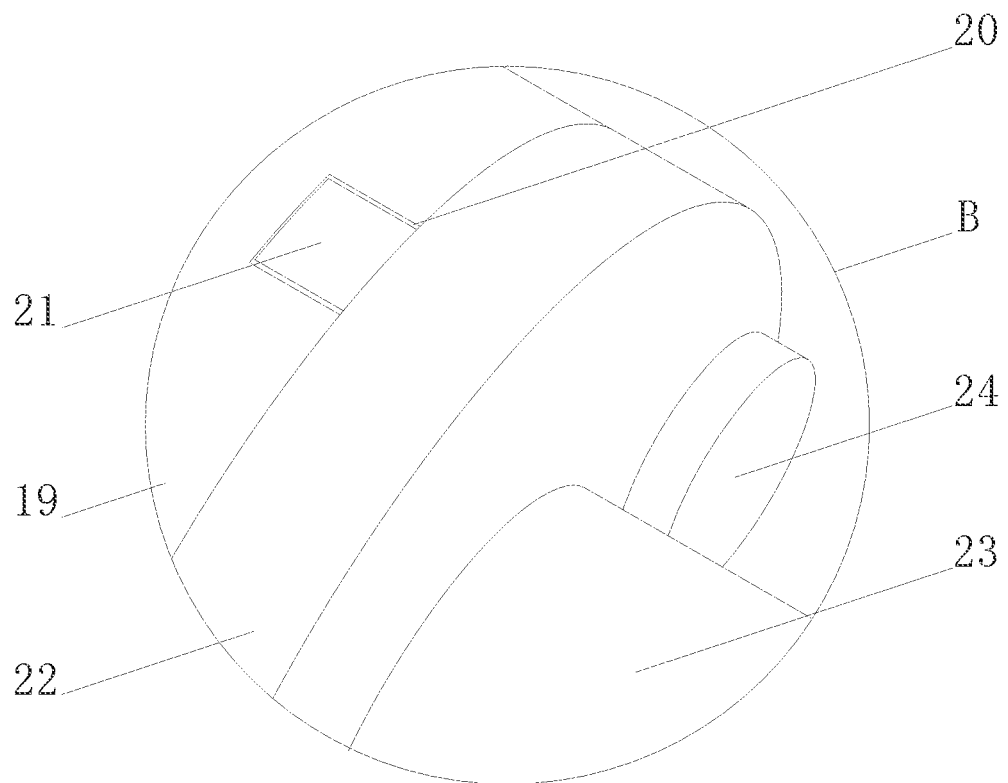
FIG. 9 is an enlarged view of the portion B in FIG. 7 of the present invention.
Figure 10:
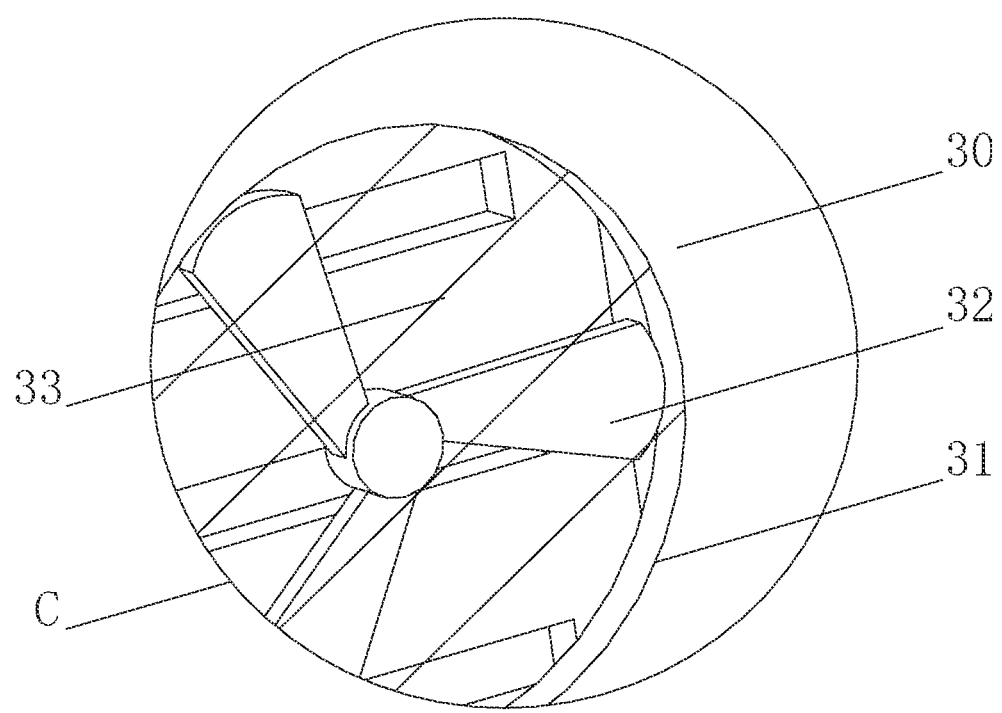
FIG. 10 is an enlarged view of the portion C in FIG. 5 of the present invention.

Referring to FIG. 1 to FIG. 8, the present invention provides the following technical schemes:

Step 1: a setting temperature of the gas oven is obtained;

Step 2: a temperature inside the gas oven is obtained;

Step 3: a low temperature threshold, a high temperature threshold and a preset flame level are determined according to the setting temperature, and the high temperature threshold is greater than the low temperature threshold;

Step 4: the temperature inside the gas oven is enabled to be between the low temperature threshold and the high temperature threshold;

Step 5: a change trend of the temperature inside the gas oven is determined;

Step 6: the flame level of the gas oven is adjusted to a lower level when the change trend is a temperature rising trend, or the flame level of the gas oven is adjusted to the preset flame level when the change trend is a temperature falling trend.

In step 1, a user can set the temperature through a panel button of the gas oven, and the setting temperature refers to the internal temperature at a head of the gas oven.

In step 2, the temperature and gas leakage in the gas oven can be detected by the temperature sensor 37 and a gas sensor installed on the head of the gas oven. The gas sensor and the temperature sensor detect the internal temperature of the gas oven, that is, the temperature in the gas oven is the internal temperature of the gas oven.

When the preset flame level is determined by the setting temperature, the preset flame may vary with the different setting temperatures. When the setting temperature is slightly higher, the preset flame level will also be higher, and when the setting temperature is slightly lower, the preset flame level will also be lower. Because when the setting temperature is slightly higher, in order to maintain the temperature of the cooking ingredients in the oven at about the setting temperature, a greater flame level is required to heat the cooking ingredients to the setting temperature. Therefore, the preset flame level is relatively large when the setting temperature is high.

The gas oven can provide at least multiple levels of flame and store the multiple levels of flame in the memory, such as EEPROM, of the gas oven controller, so that the processor of the controller can simply obtain the corresponding low temperature threshold, high temperature threshold and preset flame level according to the setting temperature plotted and presented in a reference table.

In step 4 to step 6, the gas oven is heated so that the temperature in the gas oven is between the low temperature threshold and the high temperature threshold. Subsequently, a temperature rising or falling trend is determined according to the change of the temperature in the gas oven, and then the flame of the gas oven is controlled according to the temperature rising or falling trend, thereby maintaining the temperature in the gas oven at the setting temperature.

Specifically, when the change trend is the temperature rising trend, the flame is reduced to a lower flame level; when the change trend is the temperature falling trend, the flame is increased to the preset flame level. In order to judge the change trend of the temperature in the oven, the controller of the gas oven can obtain the temperature in the oven every predetermined time such as a time interval of 0.1 second to 5 seconds, so the predetermined time can be taken as a relatively long time such as 5 seconds. In this way, it is easy to identify whether the temperature is falling or rising by comparing the temperatures in the oven before and after, so as to master the change trend of the temperature.

Therefore, when the temperature in the oven reaches the temperature range determined by the low temperature threshold and the high temperature threshold, and when the flame of the gas oven is controlled according to the change trend of the temperature in the oven, if the temperature rises, then the flame is controlled to the lowest flame level; if the temperature falls, then the flame is controlled to the preset flame level. Since the heating of the cooking ingredients in the gas oven has the characteristic of thermal inertia, there is no need to frequently adjusting flame because the temperature in the oven will not change frequently. Instead, the temperature in the oven will be kept stable within the temperature range, thus achieving the constant control of the setting temperature.

According to the control method for gas oven in the embodiments of the present invention, the setting temperature of the gas oven and the temperature inside the gas oven are obtained. The low temperature threshold, the high temperature threshold and the preset flame level are determined according to the setting temperature, and the high temperature threshold is greater than the low temperature threshold. The temperature inside the gas oven is enabled to be between the low temperature threshold and the high temperature threshold, then the change trend of the temperature inside the gas oven is determined. When the change trend is a temperature rising trend, the flame level of the gas oven is adjusted to a lower level. When the change trend is a temperature falling trend, the flame level of the gas oven is adjusted to the preset flame level. In this way, the temperature in the oven can be maintained adjacent to the setting temperature to achieve constant temperature control during the cooking process.

The embodiments of the present invention also propose a gas oven, which includes the above-mentioned control device for the gas oven. The gas oven has multiple levels of flame, and it can realize constant temperature control during the cooking process by adjusting the flame level in real time, avoiding the problem of large temperature fluctuation in the oven during the existing constant temperature control process, so as to meet the cooking needs of users and improve user experience.

In the present embodiment, the controller 27, having a model of FX3U-16MR/ES-A, is to drive the stepping motor 10, so that the gas valve body 4 can be effectively controlled when in use. The communication module 29 can remotely connect the controller 27 and the mobile phone APP network terminal, so that the use of the gas valve body 4 can be remotely controlled through the mobile phone, which improves the usability of the gas valve body 4.

The mechanical part of the present invention includes the gas oven body 1. One side of the gas oven body 1 is provided with the gas tank 2. The port of the gas tank 2 is fixedly connected with the gas pipe 3. The end of the gas pipe 3 is provided with the gas valve body 4. The top of the gas valve body 4 is fixedly connected with the fixed plate 5. The surface of the fixed plate 5 is provided with the positioning slot 6. The inner wall of the positioning slot 6 is slidably connected with the sliding plate 7. Both sides of the sliding plate 7 are provided with the limited holes 8. The top of the sliding plate 7 is fixedly connected with the mounting plate 9. The top of the mounting plate 9 is fixedly connected with the stepping motor 10. The top of the gas valve body 4 is fixedly connected with the fixed block 11. The top of the fixed block 11 is provided with the fixed groove 12. The inner wall of the fixed groove 12 is fixedly connected with the fixed rod 13. The spring 14 is sleeved on the surface of the fixed rod 13. The surface of the fixed rod 13 is slidably connected with the sliding sleeve 15. The top of the sliding sleeve 15 is fixedly connected with the connecting plate 16. One side of the connecting plate 16 is fixedly connected with the engaged rod 17. The end of the engaged rod 17 is engaged with the inner wall of the limited hole 8. Both ends of the gas valve body 4 are fixedly connected with the first connecting block 18. The end surface of the first connecting block 18 is provided with the sealing groove 19, the inner wall of the sealing groove 19 is provided with the sealing gasket 20, and the inner wall of the sealing groove 19 is slidably connected with the sealing plate 21. One side of the sealing plate 21 is fixedly connected with the second connecting block 22, one side of the second connecting block 22 is fixedly connected with the connecting pipe 23, and the end of the connecting pipe 23 is fixedly connected with the bottom of the gas oven body 1. The fixed screw 24 penetrates through the inside of the first connecting block 18 and the second connecting block 22, and the surface of the fixed screw 24 is in a threaded connection with the fixed nut 25. The other side of the gas oven body 1 is fixedly connected with the control box 26. The inner wall of the control box 26 is mounted with the controller 27. The inner bottom wall of the control box 26 is fixedly connected with the memory 28, and the inner side wall of the control box 26 is fixedly connected with the communication module 29. The temperature sensor 37 is installed on the inner side wall of the gas oven body 1, and a pt100 temperature sensor can be used.

In this embodiment, the use of the controller 27 and the stepping motor 10 is to effectively control the gas valve body 4. The communication module 29 can remotely connect the controller 27 and the mobile phone APP network terminal, so that the use of the gas valve body 4 can be remotely controlled through the mobile phone, which improves the usability of the gas valve body 4. The temperature sensor 37 installed inside the gas oven body 1 converts the temperature variables into transmittable standardized output signals and transmits them to the controller 27, and the temperature variables can be displayed on the mobile phone through the communication module 29. Through the use of the connecting plate 16, the sliding sleeve 15 slides on the surface of the fixed rod 13 to compress the spring 14, so that the engaged rod 17 can be separated from the limited hole 8, which facilitates the disassembly of the stepping motor 10. The use of the sealing groove 19, the sealing gasket 20 and the sealing plate 21 is to strengthen the connection and sealing performance between the gas valve body 4, the gas pipe 3 and the connecting pipe 23 through the second connecting block 22, so as to avoid the problem of gas leakage in the gas valve body 4, thus ensuring the safety of the gas valve body 4 when it is used.

Specifically, the input port of the stepping motor 10 is electrically connected to the output port of the controller 27, and the output port of the controller 27 is electrically connected to the input port of the communication module 29 and the input port of the memory 28.

Specifically, the surface of the control box 26 is rotatably connected with the box door 30 through a hinge, the box door 30 is internally provided with the heat dissipation groove 31, the inner wall of the heat dissipation groove 31 is provided with the cooling fan 32, and the inner wall of the heat dissipation groove 31 is fixedly connected with the filter screen 33.

In the present embodiment, the cooling fan 32 is used to facilitate the cooling process inside the control box 26, which effectively improves the heat dissipation performance inside the control box 26, thereby prolonging the service life of the electronic components inside the control box 26.

Specifically, a handle is provided on the surface of the box door 30, and the heat dissipation groove 31 and the filter screen 33 each have a circular shape.

In the present embodiment, the box door 30 can be opened more time-saving and labor-saving through the handle, the heat dissipation groove 31 can discharge heat inside the control box 26, the filter screen 33 can prevent dust from entering the inside of the control box 26, improve the dustproof performance of the control box 26, and make the electronic components inside the control box 26 have more ideal performance when working.

Specifically, both sides of the gas oven body 1 are fixedly connected with the supporting legs 34, the bottom of each supporting leg 34 is provided with a rubber pad.

In the present embodiment, the supporting legs 34 are configured to provide an effective support for the gas oven body 1, resulting in stronger stability.

Specifically, the surface of the supporting leg 34 is fixedly connected with the reinforcing plate 35, the top of the reinforcing plate 35 is fixedly connected with the bottom of the gas tank 2.

In the present embodiment, the gas tank 2 can be limited by the reinforcing plate 35, which improves the fixing effect of the gas oven body 1.

Specifically, the surface of the sliding sleeve 15 is fixedly connected with the sliding block 36, the surface of the sliding block 36 is slidably connected with the inner wall of the fixed groove 12.

In the present embodiment, the sliding block 36 is provided to make the sliding sleeve 15 move more stably on the surface of the fixed rod 13.

Specifically, the diameter of the inner wall of the limited hole 8 is adapted to the diameter of the end of the engaged rod 17, the left side of the second connecting block 22 is fixedly connected with the end of the gas pipe 3.

In the present embodiment, the use of the limited hole 8 and the engaged rod 17 is to facilitate the limiting of the stepping motor 10, and at the same time make the disassembly of the stepping motor more convenient. The second connecting block 22 is to promote the connection between the gas pipe 3 and the connecting pipe 23, so that the gas oven body 1 is more convenient to use.

The working principle and using process of the present invention will now be described. Firstly, the use of the controller 27 is to effectively control the stepping motor 10. The communication module 29 can remotely connect the controller 27 and the mobile phone APP network terminal, so that the use of the gas valve body 4 can be remotely controlled through the mobile phone. At the same time, the working situation of the stepping motor 10 can also be observed in real time on the mobile phone, which improves the usability of the gas valve body 4. When the gas valve body 4 is disassembled, by pulling the connecting plate 16, the sliding sleeve 15 slides on the surface of the fixed rod 13 to compress the spring 14. The engaged rod 17 can be separated from the limited hole 8 due to the elastic force of the spring 14, so the sliding plate 7 at the bottom of the mounting plate 9 can be extracted from the inside of the positioning slot 6, making the stepping motor 10 easy to be disassembled. The sealing plate 21 on one side of the second connecting block 22 is slidably connected with the inner wall of the sealing groove 19, then the fixed screw 24 penetrates through the inside of the first connecting block 18 and the second connecting block 22, and the fixed nut 25 is screwed on the surface of the fixed screw 24. As a result, the sealing performance of the connection between the gas valve body 4, the gas pipe 3 and the connecting pipe 23 can be effectively improved, thus ensuring the safety and practicability of the gas valve body 4 when it is used.

At the same time, the working situation of the stepping motor can be observed in real time on the mobile phone. Through the use of the fixed plate, the mounting plate, the positioning slot and the sliding plate, it is to facilitate the positioning of the stepping motor during installation. Through the cooperation of the fixed groove, the fixed rod, the sliding sleeve, the spring and the connecting plate, the engaged rod can be engaged and disengaged with the limited hole, making the stepping motor more convenient to be installed and disassembled with high practicability.

For the control method of stepwise and stepless linear adjustment of the gas oven and its gas valve, the use of the first connecting block, the sealing groove, the sealing gasket, the sealing plate and the second connecting block is to obtain the optimal sealing effect of the connection between the gas valve body and the gas pipe, which can effectively prevent the problem of gas leakage caused by the non-compact connection between the gas pipe and the gas valve body, thus ensuring the safety of the gas valve body when it is used, and it can better meet the utility needs of users.

Finally, it should be noted that: the above descriptions are only preferred embodiments of the present invention and are not intended to limit the present invention. Although the present invention has been described in detail with reference to the foregoing embodiments, technicians skilled in the field can still modify the technical solutions described in the foregoing embodiments, or equivalently replace some of the technical features. Any modification, equivalent replacement, improvement, etc., made within the spirit and principle of the present invention should be included in the scope of protection of the present invention.

What is claimed is:

1. A gas oven comprising:

a gas oven body, wherein a first side of the gas oven body is provided with a gas tank, a port of the gas tank is fixedly connected with a gas pipe;

a gas valve body provided on an end of the gas pipe, a top of the gas valve body is fixedly connected with a fixed plate, a surface of the fixed plate is provided with a positioning slot, a sliding plate is slidably connected to an inner wall of the positioning slot, each of two opposing sides of the sliding plate is provided with a limited hole, a top of the sliding plate is fixedly connected with a mounting plate, a top of the mounting plate is fixedly connected with a stepping motor, the top of the gas valve body is fixedly connected with a fixed block, a top of the fixed block is provided with a fixed groove, an inner wall of the fixed groove is fixedly connected with a fixed rod, a spring is sleeved on a surface of the fixed rod, a sliding sleeve is slidably connected to the surface of the fixed rod, a top of the sliding sleeve is fixedly connected with a connecting plate, one side of the connecting plate is fixedly connected with an engaged rod, an end of the engaged rod is engaged with an inner wall of the limited hole, each of both ends of the gas valve body is fixedly connected with a respective first connecting block, an end surface of the first connecting block is provided with a sealing groove, an inner wall of the sealing groove is provided with a sealing gasket, a sealing plate is slidably connected to the inner wall of the sealing groove, one side of the sealing plate is fixedly connected with a second connecting block, one side of the second connecting block is fixedly connected with a connecting pipe, an end of the connecting pipe is fixedly connected with a bottom of the gas oven body, a fixed screw penetrates through an inside of the first connecting block and the second connecting block, a surface of the fixed screw is in a threaded connection with a fixed nut;

a control box fixedly connected with a second side of the gas oven body, an inner wall of the control box is provided with a controller, an inner bottom wall of the control box is fixedly connected with a memory, an inner side wall of the control box is fixedly connected with a communication module; and a temperature sensor is installed on an inner side wall of the gas oven body, and the temperature sensor is a pt100 temperature sensor.

2. A control method of at least one of stepwise adjustment or a stepless linear adjustment of the gas oven of claim 1, comprising:

step 1: obtaining a setting temperature of the gas oven;

step 2: obtaining a temperature inside the gas oven;

step 3: determining a low temperature threshold, a high temperature threshold and a preset flame level according to the setting temperature, wherein the high temperature threshold is greater than the low temperature threshold;

step 4: enabling the temperature inside the gas oven to be between the low temperature threshold and the high temperature threshold;

step 5: determining a change trend of the temperature inside the gas oven if the temperature inside the gas oven is lower than or higher than the setting temperature; and step 6: adjusting a flame level of the gas oven to the preset flame level when the change trend of the temperature inside the gas oven indicates the temperature inside the gas oven rises or falls.

3. The control method of claim 2, wherein a temperature control inside the gas oven comprises the at least one of the stepwise adjustment or the stepless linear adjustment.

4. The control method of claim 2, wherein in step 1, a user sets the setting temperature through a panel button of the gas oven, and the setting temperature corresponds to an internal temperature at a head of the gas oven.

5. The control method of claim 2, wherein in step 2, the temperature inside the gas oven is measured by the temperature sensor, wherein the temperature sensor is installed on a head of the gas oven and a gas leakage inside the gas oven is detected by a gas sensor installed on the head of the gas oven, if the temperature measured by the temperature sensor is less than the low temperature threshold, and a gas is detected in the gas oven, then the gas leakage is determined.

6. The control method of claim 4, wherein when the preset flame level is determined by the setting temperature, the preset flame level varies with different setting temperatures.

7. The control method of claim 2, wherein the gas oven provides multiple levels of flame and store the multiple levels of flame in the memory of the controller of the gas oven, wherein the memory comprises an electrically erasable programmable read-only memory (EEPROM).

8. The control method of claim 2, wherein in step 4 to step 6, the gas oven is heated and the temperature inside the gas oven is between the low temperature threshold and the high temperature threshold; a temperature rising trend or a temperature falling trend is determined according to a change of the temperature inside the gas oven; and then the flame level of the gas oven is controlled according to the temperature rising trend or the temperature falling trend, and the temperature inside the gas oven is maintained at the setting temperature.

9. The control method of claim 2, wherein when the change trend indicates the temperature inside the gas oven rises, the flame level of the gas oven is reduced to a lower flame level; and when the change trend indicates the temperature inside the gas oven falls, the flame level of the gas oven is increased to the preset flame level.

10. The control method of claim 2, further comprising: remotely connecting the controller of the gas oven to an APP network terminal of a mobile phone by using the communication module, and controlling the gas valve body through the mobile phone.

11. The gas oven of claim 1, wherein a surface of the control box is rotatably connected with a box door through a hinge, the box door is internally provided with a heat dissipation groove, an inner wall of the heat dissipation groove is provided with a cooling fan, and the inner wall of the heat dissipation groove is fixedly connected with a filter screen.

12. The gas oven of claim 1, wherein a surface of the sliding sleeve is fixedly connected with a sliding block, a surface of the sliding block is slidably connected with the inner wall of the fixed groove; a diameter of the inner wall of the limited hole is adapted to a diameter of the end of the engaged rod, a left side of the second connecting block is fixedly connected with the end of the gas pipe.

* * * * *